(No Model.)
R. CHESTER.
FOG HORN.
No. 266,270. Patented Oct. 24, 1882.
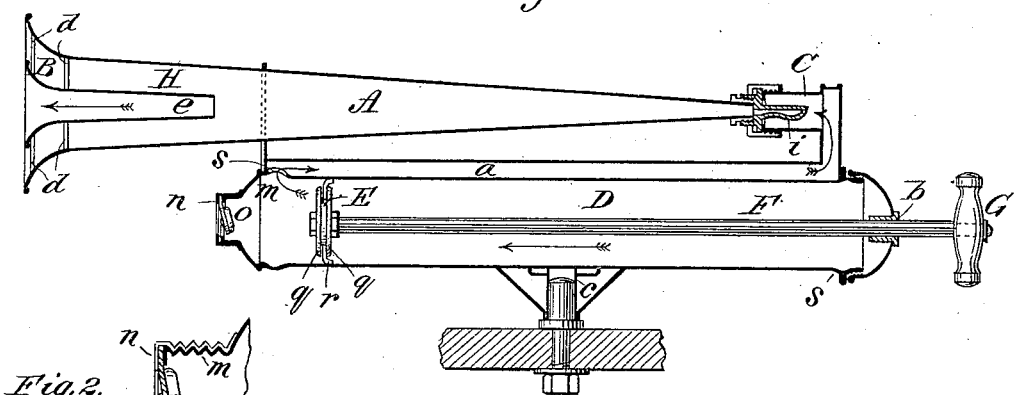
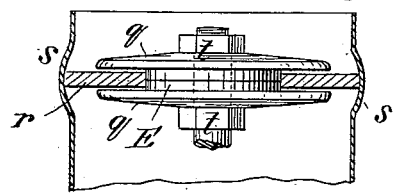
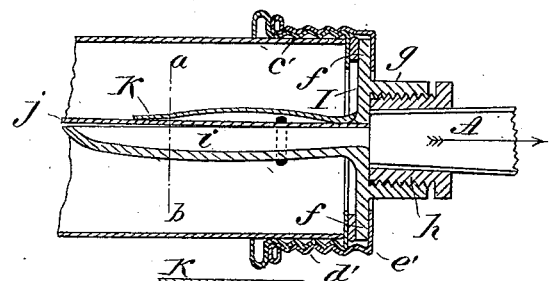
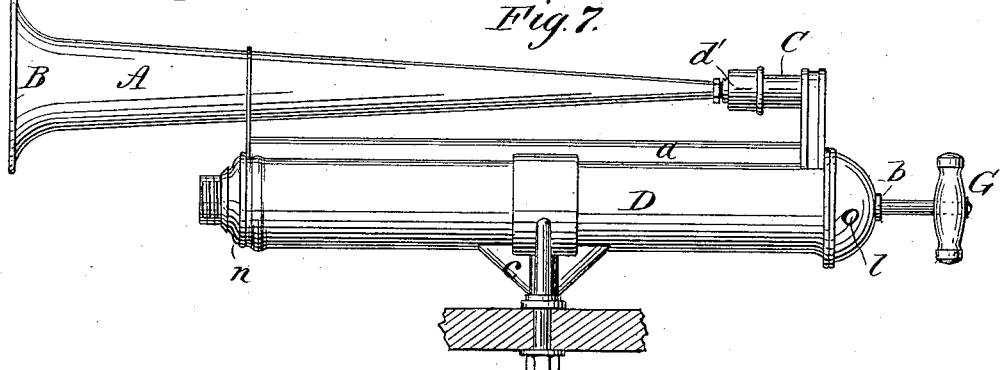
WITNESSES:
Donn Twitchell
C. Sedgwick
INVENTOR:
R. Chester
BY Munn & Co.
ATTORNEYS.

UNITED STATES PATENT OFFICE.

RICHARD CHESTER, OF CHICAGO, ILLINOIS.

FOG-HORN.

SPECIFICATION forming part of Letters Patent No. 266,270, dated October 24, 1882.

Application filed February 10, 1882. (No model.)

*To all whom it may concern:*

Be it known that I, RICHARD CHESTER, of Chicago, in the county of Cook and State of Illinois, have invented certain new and useful Improvements in Fog-Horns, of which the following is a full, clear, and exact description.

My present invention relates to certain details of construction which aim to improve the apparatus as shown and described by me in Letters Patent dated December 14, 1880; and the novel and essential features of such improvements consist, first, in providing the sound-disperser with an elongated tapering neck extending within the body of the trumpet; secondly, in combining with the air-compressing cylinder a detachable ingress-valve; and, finally, in the arrangement of a spring above the vibrating reed, all as will be more fully hereinafter set forth.

Reference is to be had to the accompanying drawings, forming part of this specification, in which similar letters of reference indicate corresponding parts in all the figures.

Figure 1 is a longitudinal sectional view of the apparatus. Fig. 2 is a detail view, on a larger scale, of one end of the air-compressing cylinder and detachable valve. Fig. 3 is a longitudinal section of one portion of the air-chamber enlarged, showing the vibrating tongue or reed and its spring and connections. Fig. 4 is a cross-section, taken through the line $a\ b$ in Fig. 3, of the tongue or reed and its lip and spring. Figs. 5 and 6 show in section one of the grooved ends of the air-compressing cylinder, its piston, and the relative form of the flexible disk within the groove and while passing through the body of said cylinder, the latter being indicated by the dotted lines in Fig. 6; and Fig. 7 is a side elevation of the apparatus complete.

A is a trumpet of the ordinary form, which is provided with a flaring or bell-shaped mouth, B, and is connected with a cylindrical air-chamber, C. The air-compressing cylinder D communicates with the air-chamber C by means of the air-conduit $a$, which leads into one end of said cylinder.

E is the air-compressing piston, which is connected to a rod, F, passing through a stuffing-box, $b$, arranged at one end of the cylinder D, and projecting sufficiently to receive a handle, G, whereby motion may be communicated to the piston E.

The whole apparatus is suitably mounted on a pivot-pin, $c$, so that it may be turned in any desired direction.

Arranged centrally within the bell-shaped mouth B of the trumpet A, and supported by braces $d\ d$, is a hollow sound-disperser or secondary trumpet, H, which is constructed with a flaring mouth and long tapering neck $e$, extending within the body of the trumpet A a considerable distance—say about one-fourth of its length—the object of which is to arrest and break the volume of sound at a point remote from the mouth of the trumpet A, thereby effecting a more thorough and perfect breaking up or dispersion of the sounds and increasing the power of the vibrations.

I is the reed-holder, which is provided with the coupling-shoulders $f\ f$, internally screw-threaded neck or mouth $g$, for engaging the screw-threaded end $h$ of the trumpet A, and spoon-shaped bill $i$, all constructed in one piece.

To the back part of the spoon-shaped bill $i$ is secured the vibrating tongue or reed $j$ by means of screws or other suitable fastening, and above the reed $j$ is arranged a bent spring, $k$, all of which parts are clearly shown in Fig. 3.

The spring $k$ exerts a sufficient pressure upon the vibrating reed $j$ to prevent undue bending of its front end under strong air-pressure, and thereby serves to maintain a steady and uniform vibration of the reed at all times.

The air-compressing cylinder D is provided at one end with an opening, $l$, to permit the escape of the back air when the piston-rod is drawn out. The opposite end of said cylinder D is provided with an externally screw-threaded end, $m$, to engage an internally screw-threaded cap, $n$, between which and the end of the cylinder the disk-valve $o$ is held.

Referring to the detail view, Fig. 2, it will be seen that the disk $p$ of the valve $o$ is pressed tightly against the end of the cylinder D when the cap $n$ is screwed on, thus, in case of inoperativeness of the valve or damage thereto, it may be removed by simply unscrewing the cap $n$.

Between the face-plates $q\ q$ of the air-compressing piston E is interposed a flexible disk or packing-ring, r, made of rubber or other equivalent material. The disk or packing-ring r projects out beyond the face-plates q q, and has a diameter greater than the diameter of the body or straight portion of the cylinder D, but equal to that of the grooved or enlarged portions s s. Nuts t t, working on the piston-rod F, serve to effect the adjustment of the disk r between the face-plates q q.

Fig. 5 illustrates the piston E at the end of its stroke and the disk or packing-ring r as fully expanded within the groove or recess s. A corresponding groove, s, is provided at each end of the cylinder D. As the piston E passes the grooved portion of the cylinder the peripheral edge of the disk or packing-ring r is bent down as shown in dotted lines in Fig. 6, and continues thus until the groove s, at the other end of the cylinder, is reached, when it is again expanded, and as it passes out of the groove on the return-stroke of the piston its edge is bent down in a reverse direction, and so on, reversing itself at each end of the cylinder.

In Fig. 1 the flexible disk r is shown bent down in the position it assumes while the piston E is traversing the straight portion or body of the cylinder D. This construction of the piston E gives great flexibility of bearing-surface, which enables it to be moved with greater ease and with less friction through the cylinder D.

The cylindrical air-chamber C is provided with an exterior screw-threaded end, c', and is secured to the reed-holder I by a collar, d', having shoulders e' e', adapted to take over the shouldered ends f f of the reed-holder I, and an internally screw-threaded end to engage the screw-threaded end of the chamber C.

The operation of the apparatus is as follows: The piston E being moved toward the handle end, air will enter the air-compressing cylinder D through the valve o. The return-stroke of the piston closes the valve o and forces the air through the opening in the end of the cylinder D into the air-conduit a and on into the cylindrical air-chamber C, causing the vibrating reed j to produce loud sounds, which are driven through the trumpet A, the waves of sound being arrested and deflected, in their passage through the trumpet A, by striking against the sound-disperser or secondary trumpet H at a point considerably removed from the mouth of the trumpet A. A portion of the sounds are forced to enter the interior of the secondary trumpet H, and are issued therefrom in a straight direction, while the remaining portions will strike against the exterior wall thereof, and will be forced through the mouth of the trumpet A, and will be dispersed in the atmosphere in different directions.

While my improved horn is especially designed for use on vessels, it is equally well adapted for manufactories and workshops where steam-power is not employed, and also for domestic use, where it is necessary to signal at long distances.

Having thus described my invention, what I claim as new, and desire to secure by Letters Patent, is—

1. The auxiliary trumpet H, centered at its flaring end in the mouth B of a fog-horn, and provided with an inwardly-tapering extension, e, reaching about one-fourth the length of the fog-horn, whereby the volume of sound is arrested in the body of the horn, there broken up, and the power of the vibrations thereby augmented, as described.

2. The combination, with a fog-horn trumpet, A, of an air-compressing cylinder, D, communicating with said trumpet, and having enlargements at each end, and a piston, E, having a packing of larger diameter than the piston-cylinder, as and for the purpose specified.

RICHARD CHESTER.

Witnesses:
 WILLIAM INGRAM,
 WALTER BANYON.